Patented Sept. 19, 1950

2,522,775

UNITED STATES PATENT OFFICE 2,522,775

COPOLYMERIZING MALEIC ANHYDRIDE AND VINYL ACETATE

Harold W. Bryant, Kenmore, N. Y., assignor to E. I. du Pont de Nemours & Company, Wilmington, Del., a corporation of Delaware No Drawing. Application November 18, 1949, Serial No. 128,230

7 Claims. (Cl. 260—78.5)

This invention relates to the copolymerization of maleic anhydride with vinyl acetate and more particularly to a process for producing the copolymer in a particulate form.

The copolymerization of maleic anhydride and vinyl acetate when initiated by catalytic action tends to become violent and uncontrollable due to the evolution of a considerable amount of heat. Accordingly, this process generally is carried out in solution in a solvent such as benzene or xylene. Generally it has been preferred to use solvents such as xylene or benzene in which the copolymer is insoluble, so as to produce the copolymer in a finely divided solid form. Solvents in which the copolymer is soluble have heretofore been unsatisfactory due to the difficulties encountered in removing the solvent to produce a solid material. Evaporation of the solvent gradually changes the copolymer solution from a mobile liquid to a thick, viscous mass, from which it is difficult to remove the last traces of the solvent. The resulting solid must be ground and screened to produce a granular product. On the other hand, solvents such as xylene or benzene in which the copolymer is insoluble tend to yield an extremely finely divided powdery material which is very dusty and difficult to handle. Polymerization of coarse aqueous dispersions, conventionally used to produce granular polyvinyl acetate, cannot be employed, as the water reacts with the maleic anhydride to produce maleic acid, which does not copolymerize with vinyl acetate.

An object of the present invention is an improved method for the copolymerization of vinyl acetate with maleic anhydride. A further object is to produce vinyl acetate/maleic anhydride copolymer in a free-flowing, particulate form. Another object is a process for producing a particulate form of the maleic anhydride/vinyl acetate copolymer, wherein the particle size can be controlled over a wide range. Still further objects of the invention will be apparent from the following description.

The above objects may be attained in accordance with the present inventon by copolymerizing maleic anhydride and vinyl acetate in solution in methyl acetate, in which solution the concentration of monomeric vinyl acetate is not permitted to exceed about 16% by weight, and mixing the resulting methyl acetate solution of the copolymer with a relatively large amount of monomeric vinyl acetate to cause precipitation of the copolymer in particulate form. By varying the amount of vinyl acetate used as precipitant or the mode of mixing the copolymer solution with the precipitant, the particle size of the precipitated material may be controlled over a wide range. Thus, I may produce products having particle sizes ranging all the way from those of a fine powder up to granules as large as ¼" in diameter. The process is particularly useful for producing a granular product.

In a preferred mode of practicing the invention, I dissolve maleic anhydride in substantially anhydrous methyl acetate and add thereto monomeric vinyl acetate in the proportion of 1 mole per mole of maleic anhydride in the solution. The amount of solvent utilized is such that the total concentration of maleic anhydride plus vinyl acetate in the solution is about 25–30% by weight, which is equivalent to a vinyl acetate concentration of about 12–14% by weight. The solution then is subjected to polymerization in accordance with conventional procedures, for example by adding a suitable catalyst such as benzoyl peroxide or other vinyl ester polymerization catalyst and heating under reflux until polymerization is complete. This produces a methyl acetate solution of the maleic anhydride/vinyl acetate copolymer. The copolymer solution then is added in a slow stream to an equal volume of monomeric vinyl acetate, which is continually stirred.

The rate of addition of the copolymer solution to the vinyl acetate together with the rate of agitation determines the average particle size of the precipitate. Thus by adding the material in the form of a spray with moderately rapid agitation of the vinyl acetate a relatively finely divided or powdery product is obtained. On the other hand, an extremely rapid rate of addition in a single large stream with little or no agitation, will cause the formation of large masses of precipitated material. By rapidly adding the copolymer solution to the vinyl acetate with agitation, the size of the precipitated masses is reduced, more rapid stirring forming smaller particles; and by this method I may produce granules as large as approximately ¼" in diameter.

Following the precipitation, the solid is removed by filtration or decantation and dried at a low temperature to remove adhering vinyl acetate and methyl acetate. The mixture of methyl acetate and vinyl acetate removed from the precipitated material may be reused for the polymerizing reaction and the precipitation of copolymer. My process is thus readily adapted for continuous operation, whereby a copolymer solution continuously issuing from a continuous polymerization operation is continuously mixed with a suitably large stream of monomeric vinyl acetate, the resulting precipitate continuously removed by filtration and portions of the filtrate recycled to the polymerizing and precipitating operations.

In precipitating the copolymer the copolymer solution may be added to the vinyl acetate or the two liquids may be mixed in any suitable fashion, for example by flowing streams of the two liquids into a suitable mixing device. The addition of the vinyl acetate to a copolymer solution containing 25–30% by weight of the copolymer generally is not recommended, when it is desired to produce a free-flowing, granular or powdery material of substantially uniform particle size. However, it is possible to form a finely divided product by adding the vinyl acetate to the copolymer solution if the latter first is evaporated to a suitably high concentration, i. e. a concentration of about 50% or greater. In a preferred method of carrying out this operation, I place the copolymer solution in a kneading machine or other machine equipped with means for stirring materials of high viscosity and apply heat to evaporate a large part of the solvent. As evaporation proceeds the material is continuously stirred or kneaded; and preferably, this is continued until the product assumes a taffy-like consistency and appearance (50 to 75% copolymer concentration). At this point, a relatively large quantity of vinyl acetate, for example, equal from 1 to 2 parts by weight to each part of copolymer, is added and the mixing operation is continued. The addition of the vinyl acetate causes the high viscosity material to disintegrate in a short time into a solid pulverulent to granular product, which then may be readily removed from the mixing machine. The resulting mixture of copolymer and vinyl acetate then may be filtered to recover the solid product.

The following examples further illustrate preferred modes of carrying out the invention.

Example 1

In a conventional polymerization a kettle equipped with a reflux condenser, 13 lbs. maleic anhydride was dissolved in 75 lbs. of anhydrous methyl acetate. To this was added 12 lbs. of monomeric vinyl acetate. To the resulting solution of maleic anhydride and vinyl acetate was added 0.8 lb. of alpha,alpha'-azo-bis-dimethyl-valeronitrile. The contents of the vessel then were heated to reflux, which temperature was maintained until the polymerization was complete. The resulting solution of copolymer then was permitted to flow by gravity through a ½" pipe into a tank containing a mixture of approximately 160 lbs. of vinyl acetate and 40 lbs. of methyl acetate with continuous agitation of the liquid. (The mixture of vinyl acetate and methyl acetate was made by adding vinyl acetate to the filtrate from a previous batch). Stirring was continued for a period of 15 minutes after the addition of the copolymer solution was completed. The precipitated product was removed from the liquid by filtration and dried in a conventional drier. The resulting dried product was a free-flowing granular material, 98% of which passed through a four mesh screen. Approximately half of the filtrate was mixed with an equal weight of vinyl acetate to serve as precipitant in a succeeding batch.

Example 2

The above procedure was repeated except that a peroxide polymerization catalyst was utilized. The product was substantially identical with that of Example 1.

Example 3

24 lbs. of maleic anhydride and 16 lbs. of vinyl acetate were copolymerized in solution in 105 lbs. of methyl acetate by heating at reflux temperature in the presence of a peroxide catalyst. The resulting copolymer solution was placed in a conventional kneading machine which was equipped with a steam jacket for the application of heat. In the kneading machine, the material was mixed and heated to drive off the solvent until the material became very viscous and had the appearance and consistency of taffy candy. At this point, 100 lbs. of vinyl acetate was added to the kneader and the mixing and heating was continued for a period of about 9 hours, at the end of which time the material was reduced to a finely divided form, 73.7% of which passed through a 12 mesh screen.

In practicing the present invention, many variations from the procedures as described above may be made, resulting in a production of satisfactory material. As the invention does not depend upon the procedure or catalyst used for the polymerizing reaction, any of the conventional procedures used for copolymerizing maleic anhydride with vinyl acetate in solution may be employed. Thus, while I have shown by way of illustration polymerizing in the presence of a peroxide catalyst and an azo compound catalyst, any catalyst of these types or other types known to cause polymerization of maleic anhydride and vinyl acetate may be employed. Also, the polymerization may be carried out at room temperature as well as at elevated temperatures, either higher or lower than reflux temperature, in accordance with the information possessed by those skilled in carrying out such polymerization reactions.

The invention resides primarily in the means of converting a solution of the copolymer into a pulverulent or granular material of a desired particle size. Broadly stated, this is accomplished by mixing a methyl acetate solution of the copolymer with vinyl acetate. If desired, the copolymer solution may be concentrated by evaporating off a part of the solvent or it may be diluted by addition of solvent, before mixing with the vinyl acetate to precipitate the product. In any event, in order to cause precipitation to occur, it is essential that the amount of vinyl acetate utilized, together with the solvent present, is sufficient to form a vinyl acetate solution in said solvent of a concentration exceeding 16%. That is, the amount of vinyl acetate must exceed 16% by weight of the total amount of all vinyl acetate and solvent or solvents present at the moment of mixing. Preferably, I employ an amount of vinyl acetate equal to not less than the weight of methyl acetate present (50% concentration) and, if desired, many times this amount may be used.

It is not essential to use pure vinyl acetate as precipitant, so long as the vinyl acetate concentration exceeds 16% by weight. Thus, I may utilize as precipitant a mixture of vinyl acetate with any solvent therefor, as illustrated by Examples 1 and 2 above. In such cases, I generally prefer to use a mixture of vinyl acetate and methyl acetate, so as not to introduce a third component into the filtrate. Thus, in carrying out a series of batch operations such as Examples 1 and 2, I may use as precipitant a mixture of about equal parts by weight of vinyl acetate and the filtrate from the previous batch, which mixture eventually will contain around 75–80% by weight of vinyl acetate.

The precipitation is satisfactorily carried out at room temperatures (e. g., 15–30° C.) and the temperature of the operation is not critical, provided it is below the softening point of the copolymer. The precipitation may be operated at any temperature between the freezing points and the boiling points of the ingredients of the mixture.

The mixing of the copolymer solution with the vinyl acetate may be done in any manner desired, as by adding the copolymer solution to the precipitant, adding the precipitant to the copolymer solution or running streams of the two together. However, the results obtained (particle size and uniformity thereof) will vary with the method utilized and with other factors, such manner and rate of stirring to effect mixing and the respective concentrations of copolymer and vinyl acetate.

To obtain a product exhibiting maximum uniformity in particle size, and to best control particle size, it is preferable to add the copolymer solution to the vinyl acetate by flowing a stream of copolymer solution into a body of vinyl acetate, with continuous agitation of the latter. For this preferred method, the concentration of the copolymer in the copolymer solution should not exceed about 50% by weight.

The particle size of the precipitated particulate copolymer will depend on the method employed for mixing the copolymer solution with the vinyl acetate. Thus, when precipitation is carried out by flowing the copolymer solution into vinyl acetate (or into a vinyl acetate-solvent mixture), the particle size of the precipitated particulate material is controlled by:

1. The size and character of the stream of the copolymer solution entering the vinyl acetate. Decreasing the size of the stream causes decrease in particle size. So also does subdivision of the stream to form a spray or droplets of the solution.

2. The rate of addition of the solution. The more rapid the rate of addition, the larger will be the precipitated particles.

3. Agitation of the vinyl acetate precipitant. For any given size and character of entering solution stream and rate of solution addition, increase in agitation of the vinyl acetate will decrease particle size.

When precipitation is accomplished by mixing a stream of copolymer solution with a stream of the vinyl acetate precipitant, the particle size will depend primarily on the rapidity with which mixing is accomplished, the more rapid mixing causing formation of smaller particles.

As precipitation is practically instantaneous, it is difficult to form a granular material less than around ¼" in diameter by adding the precipitant to the copolymer solution unless a drastic or violent form of agitation is utilized, which will break up the large masses initially formed. For precipitation by adding vinyl acetate to the copolymer solution, it generally is best to concentrate the copolymer solution and use a kneader or equivalent mixing machine, as illustrated by Example 3 above. In such operation, I prefer to concentrate the copolymer solution to a concentration of about 50 to 75% by weight, before adding the vinyl acetate.

The invention is not restricted to copolymerizing maleic anhydride and vinyl acetate in methyl acetate, followed by precipitation of the copolymer. If desired, the copolymer solution may be made by dissolving in methyl acetate copolymer already made, for example a dusty copolymer made by prior art methods. Thus, finely divided, or other form of solid maleic anhydride/vinyl acetate copolymer may be dissolved in methyl acetate and then precipitated therefrom in accordance with the present invention, to obtain a finely divided or granular material of a different or more uniform particle size. By this means, I can convert a dusty product to a more desirable granular form.

I claim:

1. The process for precipitating a maleic anhydride/vinyl acetate copolymer from its solution in methyl acetate which comprises mixing said solution with an amount of vinyl acetate equivalent to a vinyl acetate concentration of more than about 16% by weight of the polymer solution.

2. The process which comprises copolymerizing maleic anhydride with vinyl acetate in solution in methyl acetate under such conditions that the concentration of vinyl acetate in the solution does not exceed about 16% by weight during the polymerization reaction, and thereafter mixing the resulting solution of copolymer with sufficient vinyl acetate to cause precipitation of said copolymer in particulate form.

3. A process for preparing a copolymer of maleic anhydride and vinyl acetate in particulate form which comprises polymerizing a mixture of maleic anhydride and vinyl acetate in methyl acetate solution to obtain a solution of copolymer, while maintaining in said solution the concentration of monomeric vinyl acetate at not greater than about 16% by weight and thereafter adding the resulting solution of copolymer to vinyl acetate with continuous agitation of the latter.

4. A process for preparing a copolymer of maleic anhydride and vinyl acetate in particulate form which comprises polymerizing a mixture of maleic anhydride and vinyl acetate in methyl acetate solution to obtain a solution of copolymer, while maintaining in said solution the concentration of monomeric vinyl acetate at not greater than about 16% by weight and thereafter flowing a stream of said solution into a body of vinyl acetate, with continuous agitation of said body.

5. The process of claim 4 wherein said copolymer solution contains not more than about 50% by weight of said copolymer and the amount of vinyl acetate is not less in weight than the total weight of methyl acetate present.

6. The process of claim 4 wherein said copolymer solution contains about 25–50% by weight of said copolymer and the amount of vinyl acetate is equal to 0.2 to 2.0 times the weight of the methyl acetate present.

7. A process for preparing a copolymer of maleic anhydride and vinyl acetate in particulate form which comprises polymerizing a mixture of maleic anhydride and vinyl acetate in methyl acetate solution to obtain a solution of copolymer, while maintaining in said solution the concentration of monomeric vinyl acetate at not greater than about 16% by weight and thereafter evaporating methyl acetate from said solution until the concentration of said copolymer reaches about 50 to 75% by weight and mixing the resulting viscous mass with at least an equal part by weight of vinyl acetate.

HAROLD W. BRYANT.

No references cited.